Jan. 13, 1953  J. W. COX  2,625,309
EGG ROOM EQUIPMENT
Filed Dec. 22, 1949  3 Sheets-Sheet 2
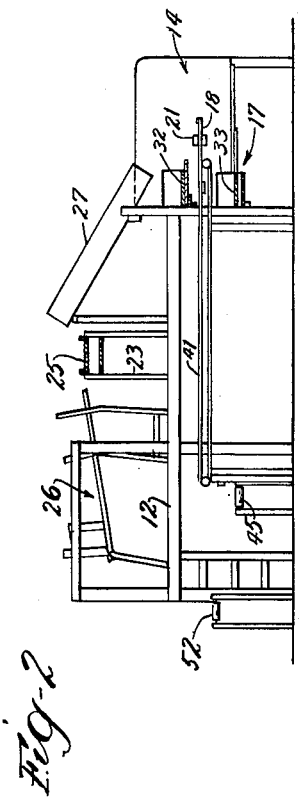
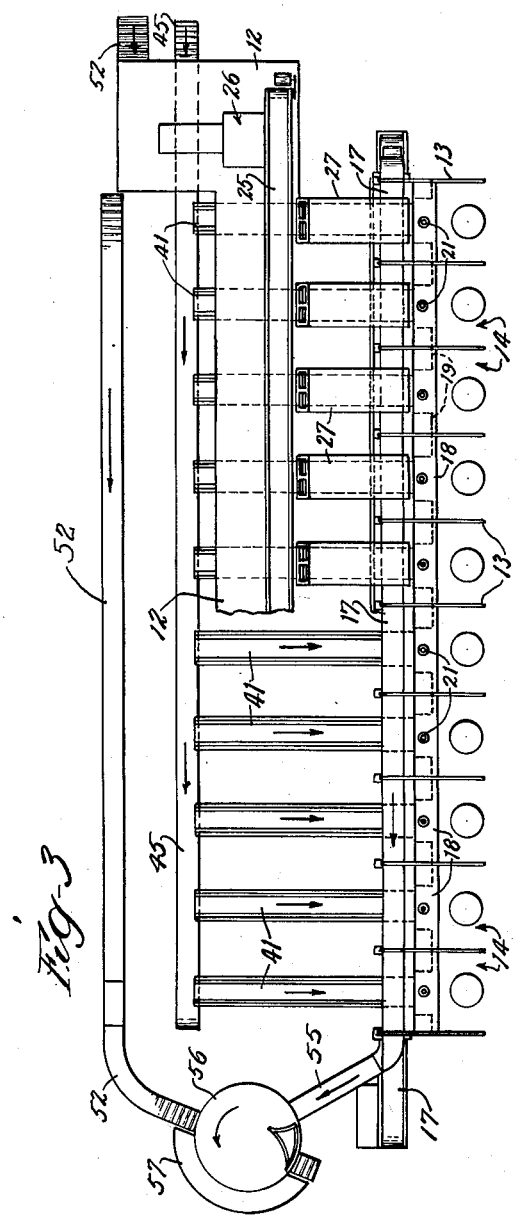
INVENTOR.
John W. Cox
BY
Cromwell, Greist + Warden
Attys

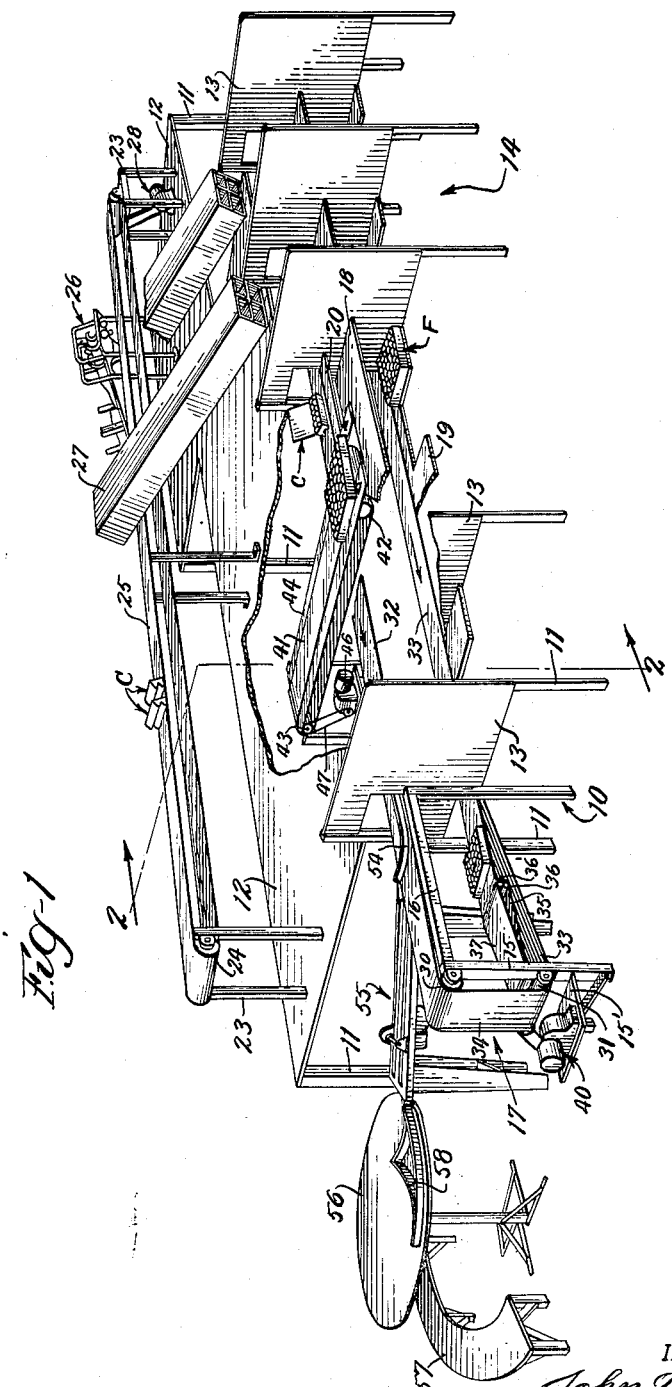

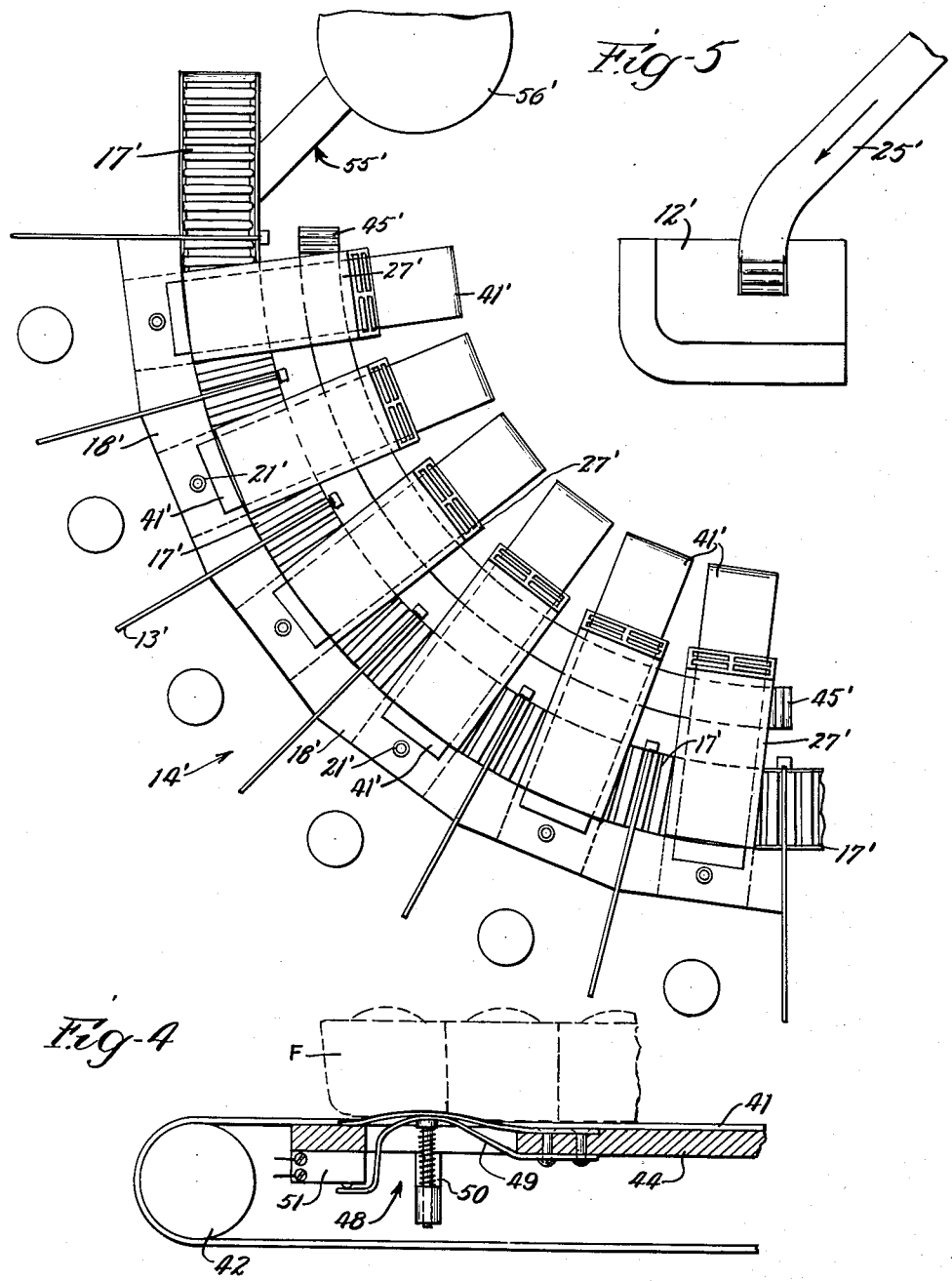

Patented Jan. 13, 1953

2,625,309

UNITED STATES PATENT OFFICE 2,625,309

EGG ROOM EQUIPMENT

John W. Cox, Chicago, Ill., assignor to Shellmar Products Corporation, Chicago, Ill., a corporation of Delaware Application December 22, 1949, Serial No. 134,515

8 Claims. (Cl. 226—2)

This invention pertains to an improved procedure in handling, inspecting and packaging eggs and to improved equipment for putting the same into practice.

Present-day high-capacity egg candling rooms in many instances employ automatic conveyor machinery for supplying the candlers with bulk uninspected eggs to be inspected and candled, as well as adequate cartons in which the eggs are deposited following inspection. The work of inspection includes the hefting or weighing of the eggs for cartoning according to weight and size, together with visual inspection and candling to detect dirt on the shells, cracks and internal defects.

It is a general object of the present invention to provide an improved egg room system or procedure by which all of the operations involved in the receiving, inspecting and cartoning of eggs, including those pertaining to the erecting of cartons from flat, collapsed condition, the supplying of cartons to the candlers and the removal and closing of the filled cartons, are performed by a minimum of service personnel in a work space of minimum size.

Another object of the invention is to provide egg room equipment characterized by a series of candling stations arranged along a side of a continuous, multiple reach conveyor on which supplies of cartoned and rejected eggs are transported to and from said stations, by a carton supply unit arranged in a double deck relation to the candling stations and conveyor, from which cartons are supplied by service personnel to each of the candling stations, and by further automatic conveyors operating transversely of the first named conveyor to keep the candlers adequately supplied with eggs to be candled.

It is a more specific object of the invention to provide vertically staged egg room equipment of the above sort including a series of work or candling stations arranged longitudinally along one side of an endless, multiple-reach, driven conveyor, and a plurality of individual intermittently actuated conveyors, one for each of the work stations, operating transversely of the first mentioned conveyor and at work shelf level to deliver bulk eggs to the work stations, for cnovenient access to the candlers therein.

Yet a further object of the invention is to provide equipment of the character referred to in the preceding paragraph in which the transversely operating conveyors are automatically controlled to advance the uninspected eggs, disposed in filler and flat assemblies, in a step-by-step fashion, toward and into the candling or work station, the automatic control of the last named conveyors being in response to the decreasing weight of the eggs as they are progressively removed from the filler and flat assemblies by the candlers.

A further object of the invention is to provide equipment embodying an endless conveyor having work stations spaced along a side thereof and individual, automatically controlled egg supply conveyors feeding the individual work stations, in combination with a further, longitudinally traveling conveyor positioned on a platform above the aforesaid conveyors and stations and operated by a relatively few service attendants to supply cartoning materials to operators at said work stations, thereby greatly reducing the floor space required for an installation of given output capacity.

A still further object of the invention is to provide equipment including, in combination, a pair of vertically staged, parallel, driven conveyors, a plurality of separated work stations disposed along a side of one thereof and individually supplied with eggs to be candled by automatically controlled conveyors acting transversely of the direction of travel of the first conveyors, a plurality of carton feeder devices delivering to the stations, one of which first named conveyors functions as a carton distributing unit on which erected cartons are transported to these devices, to be subsequently removed when filled on the other conveyor, and carton erecting and closing machines disposed, respectively, in supply relation to one of the aforesaid conveyors and in receiving relation to the other thereof, whereby a minimum number of operators may be supplied with erected cartons for distribution through said feeder devices to said work stations, and whereby filled cartons may be automatically discharged and closed, which equipment enables all the operations involved in the candling and packaging of the eggs to be performed expeditiously in a small space by an absolute minimum of personnel.

It is a further specific object of the invention to provide egg room equipment including a longitudinally traveling conveyor by which inspected and cartoned eggs may be transported from a plurality of working stations arranged along one side of the conveyor to and through a carton closing apparatus and by which inspected and rejected eggs may be transported to a disposal point, and a plurality of transversely acting egg supply conveyors, one for each of said work stations, in which the egg supply conveyors are automatically controlled by the weight of eggs in filler and flat assemblies thereon to effect a step-by-step advance of the assemblies into the respective egg stations, delivering at a point therein which permits convenient access by the candlers in the stations, the automatic egg supply conveyors requiring no attention other than that of a service operator in placing additional egg containing fillers and flats thereon from time to time.

The foregoing statements are indicative in a general way of the nature of the invention, but other and more specific objects will be apparent to those skilled in the art upon a full understanding of the construction and operation of the device.

Two embodiments of the invention are presented herein for purpose of illustration, and it will be appreciated that the invention is susceptible of incorporation in other modified forms coming equally within the scope of the appended claims.

In the drawings,

Fig. 1 is a perspective view illustrating the improved equipment of the present invention and indicating the manner of operation thereof, this view being partially broken away to more clearly illustrate the relationship of certain of the conveyor and work station provisions;

Fig. 2 is a view in transverse vertical section, viewed approximately at the plane designated 2—2 of Fig. 1, further illustrating various structural relationships of the component parts of the equipment;

Fig. 3 is a top plan view of the equipment, partially broken away;

Fig. 4 is a fragmentary detail view in vertical section, somewhat enlarged, illustrating a suitable device for controlling the step-by-step feed of filler and flat assemblies containing uninspected eggs into the several candling stations of the equipment, and Fig. 5 is a fragmentary view illustrating a modified adaptation of the principles of the invention to an arcuate installation, this view being entirely schematic in nature.

The various operating instrumentalities of the embodiment of the invention illustrated in Figs. 1, 2 and 3 of the drawings are supported on a suitable rigid framework which is generally designated 10. This includes sets of longitudinally and transversely spaced uprights 11, which support an elevated platform 12 on which supply attendants take their positions, and also support certain vertical partition panels 13 which are spaced longitudinally of the equipment to define a plurality of individual work or candling stations, generally designated 14. Further upright frame elements 15 and associated longitudinal angle iron members 16 rigidly secured together in any appropriate fashion constitute supports for an endless, longitudinally operating, belt-type conveyor 17. Suitable provision of a conventional nature, not believed necessary to be illustrated in detail, is made for the support of the several horizontal reaches of the conveyor 17 during the longitudinal travel thereof.

Each of the candling booths 14 is provided with a horizontal work shelf 18 on which egg cartons C may be placed while their intended contents are being inspected. The further horizontal shelving 19, 20 is provided for the reception of flat and filler assemblies F or other cartoning materials. Naturally, the particular character of such provisions admits of considerable variation.

Each booth or station is also equipped with a candling light 21 (see Figs. 2 and 3) which is conveniently located for the use of the candler positioned at the station.

The platform 12 supports a second rigid conveyor frame 23 having longitudinally spaced end rollers or pulleys 24 about which the relatively wide flexible, endless belt conveyor 25 is trained. One end of the conveyor 25 is positioned adjacent the discharge side of a known type of egg carton set-up machine 26, this machine delivering erected paperboard cartons C onto the upper reach of the conveyor 25 (see Fig. 1).

A plurality of longitudinally spaced carton supply or distributon chutes 27 of elongated, hollow, rectangular, internally quartered construction are suitably supported by the platform 12 or structure associated therewith, as illustrated, for example, in Fig. 2, to extend downwardly from adjacent one side of the conveyor 25 into the candling booths 14, there being a delivery chute for each booth. This arrangement enables an operator standing on platform 12 to feed flat, knock-down cartons to and supervise the operation of the set-up machine 26 and also to manually distribute erected cartons from the conveyor 25 to the various individual chutes 27. The conveyor 25 is driven in appropriate timed relation to the operation of the set-up machine 26 by a motor powered, belt drive 28 supported on platform 12.

The floor-supported endless belt conveyor 17 is trained over pairs of vertically spaced drums or pulleys 30, 31 supported by the frame uprights 15 adjacent opposite extreme ends of the equipment, the conveyor traveling along the rear of the candling stations 14. It is desirable, for reasons that will hereinafter appear, that both the upper and the lower reaches 32, 33 of this conveyor travel in the same direction, as indicated by the arrows in Fig. 1. In order to accomplish this result by a minimum of belt supporting and guiding structure, the conveyor 17 is actually made up of two separate belts of unequal length and equal width, positioned in vertical and longitudinal alignment with one another and trained in common about the lowermost set of pulleys 31. The upper reach of the outer longer belt 34 constitutes the upper article-supporting reach 32 of the conveyor considered as a whole, while the upper reach of the shorter inner belt 35 is spaced substantially therebelow and provides the lower article-supporting reach 33 of the conveyor. Referring to Fig. 1, it will be noted that the inner belt 35, adjacent the lower pulley 31, is successively trained over a pair of small, vertically offset idler pulleys 36, 36' to afford space for a flat receiving table 37 disposed substantially coplanar with the lower belt reach 33.

The lower reaches of the individual belts 34 and 35, and the upper reach of last named, travel in superposed, closely adjacent relation throughout the major portion of the length of the equipment and are appropriately supported to sustain the load thereon by a flat surface or equivalent provision on the framework 10 of the equipment. It is desirable that suitable means be provided to separate these belt reaches, certain of which travel in opposite directions, in order to minimize friction.

Conveyor 17 is driven by the gear head motor and belt drive device, generally designated 40, supported on a rigid shelf 15' which is secured to the end frame uprights 15.

A plurality of transversely extending, automatically controlled and intermittently driven, belt-type bulk egg conveyors 41 are included in the apparatus for the purpose of supplying eggs to be inspected to the candlers in booths 14. These conveyors are supported by pulleys 42, 43 at the opposite ends thereof, which pulleys are in turn supported by the framework of the equipment. As shown in Figs. 1, 2 and 3, conveyors 41 extend transversely of the previously described conveyors 17, 25, being positioned horizontally between the reaches 32, 33 of conveyor 17 to deliver eggs to the booths 14 at the level of the work shelf 18. There is a conveyor 41 for each booth, arranged centrally of the booth partitions 13. The upper reach of the belt conveyor 41 is sustained by a horizontal table surface 44 extending between the pulleys 42, 43, see Figs. 1 and 2. As illustrated in Fig. 2, this intermittent conveyor extends for a substantial distance transversely of the equipment, from a longitudinally arranged and inclined roller-type gravity conveyor 45 which runs along the rear side of the equipment into the candling booths 14 on the opposite front side. It discharges adjacent the shelving 18 for easy access of the candler to the eggs in the flats and fillers F, which are transported thereby under automatic step-by-step control.

Conveyors 41 are each driven by a gear head motor 46 and belt drive 47, as illustrated in Fig. 1, and the above mentioned control of their movement is effected by the microswitch device 48 illustrated in Fig. 4. This or an equivalent arrangement is employed to govern the drive of belt 41 whereby the latter advances a distance corresponding to the front-rear width of one row of cells of the filler and flat F as the eggs in the leading row of cells of the latter are emptied.

A typical arrangement may include a pair of leaf-type switch elements 49 suitably secured at one end to the belt supporting table surface 44 and urged upwardly through apertures in the latter by the spring biased devices 50. These switch elements are depressed by a laden flat and filler assembly F, forwarded on conveyor 41 to interrupt the motor drive for the latter. In this position adjacent the delivery end of the conveyor the flat and filler is readily grasped by the candler at booth 14 and drawn forwardly onto the fixed work shelf 18. Switch elements 49 assume the fully elevated position illustrated in Fig. 4 when the flat and filler is withdrawn from the conveyor, causing the elements 49 to engage the switch button of a standard microswitch 51 and thereby complete an energizing circuit through the latter and through motor 46. Forward movement of belt conveyor 41 ensues until the succeeding flat and filler F comes over and depresses the elements 49, thus breaking the circuit at switch 51 and interrupting the motor drive. When that flat and filler has been removed to shelf 18 intermittent advance of conveyor 41 continues to forward a succeeding assembly to delivery position. These assemblies are placed on the conveyor by an attendant stationed adjacent the inclined, gravity-type roller conveyor 45, along which 30-dozen size crates of eggs, bulk packed in flats and fillers, are fed longitudinally of the equipment. The attendant successively removes the flat and filler assemblies from the crates and deposits the same on belt conveyor 41. Eggs purchased from different farm sources may be stacked on conveyor 45 adjacent the transverse conveyors 41 feeding different booths 14, to the end that inspection and cartoning of different grades or types of eggs may be performed by different individual candlers.

A further roller-type gravity conveyor 52, paralleling the conveyor 45 and located rearwardly thereof, may be employed by the attendant in forwarding empty egg crates, deposited thereon after being emptied to conveyors, toward a final crating station, hereinafter referred to.

In the operation or use of the equipment, the carton set-up machine 26 is placed in operation and cartons C erected by the latter are received on the upper conveyor 25 for longitudinal travel to the left, as illustrated in Fig. 1. An attendant on the platform 12, who is also charged with the duty of supervising the loading and operation of the set-up machine, proceeds to remove empty erected cartons from the conveyor 25 and to charge the same to the inclined gravity distribution chutes 27 by which they are delivered to the candling booths 14. The candler at the booth removes a carton (or several cartons which are to be filled with different grades of eggs) from the chute and places the same on shelf 18, or on one of the other shelves in the booth. She then pulls a flat and filler forwardly from the transverse conveyor 41, inspects the eggs in the same, using candling light 21, and places them in proper cartons, or, in the case of dirties, checks, rottens or other rejects, places them in empty flats and fillers which may be placed on the shelving 19. When a carton has been filled, it is placed by the candler on the upper reach 32 of conveyor 34, by which it is transported away from the booth. When the flat and filler withdrawn from conveyor 41 has been emptied, it may be placed on the lower reach 33 for outward transport. A flat and filler assembly which has been filled with rejects by the candler is also placed on reach 33 for removal and is transported thereby to the end delivery table 37, whence it may be removed by an operator and suitably disposed of. Conveyor 41 automatically keeps a flat and filler of eggs to be inspected within easy reach of the candler.

Filled cartons are carried on upper belt reach 32 outwardly of the inspection section of the equipment, being diverted laterally from said upper reach by a fixed curved diverter arm 54 overhanging the belt, into a conventional type of carton closing machine 55. The carton covers are closed and the cartons sealed and dated by an automatic printing device during their travel through machine 55 and discharge therefrom onto a driven rotary receiving table 56. They are lifted from this and deposited on an arcuate delivery bench 57 disposed concentric therewith, a fixed curved guide and directing arm 58 associated with table 56 preventing the cartons from interfering with those leaving the closer 55. The cartoned eggs are successively packed in standard egg crates at bench 57, from which the filled crates are removed to a disposal point for nailing, etc.

The above described equipment is simple, relatively inexpensive, compact and economical of floor space as well as of personnel required to operate the same. The platform 12 is a low one, as shown in Fig. 2, there being only sufficient vertical clearance above conveyors 41 to enable passage of flats and fillers F. Thus, notwithstanding the vertically staged character of the equipment, it may be installed in a room of standard, even low, ceiling height and still afford adequate head room for attendants standing on the platform and for the carton erecting and lateral distributing provisions.

The automatically controlled character of the bulk egg conveyors 41 makes each candler independent of others with respect to the speed at which she candles and cartons eggs. No personal supervision of the operation of this unit is required. Moreover, its location with relation to the booth interior is such as to enable the candler to do her work with maximum ease and in comfort. This is also true with reference to the rear feed side of the conveyors. They may be serviced with eggs to be candled quickly and efficiently by minimum personnel stationed adjacent conveyor 45.

The same attendants who perform this duty can also attend to the removal of filled cartons from table 56 and crating thereof, the removal of flats and fillers empty or containing rejects, from table 37 and the removal of excess packaging materials in general. The further roller-type gravity conveyor 52 paralleling the conveyor 45 as shown in Fig. 3, is employed to supply the operator at bench 57 with packing crates in which he places filled cartons.

One or two operators stationed on platform 12 suffice to supervise the loading of set-up machine 26 and the transfer of set-up cartons from conveyor 25 to the individual distribution chutes 27 in adequate quantity to keep the candlers properly supplied with cartons at all times. To my knowledge no existing system affords comparable efficiency of operation coupled with the minimum requirements as to personnel, compactness of floor space and head room, and power which characterize the described equipment.

A modified adaptation of the invention is schematically illustrated in Fig. 5, in which the candling booths are disposed in an arcuate outline. Inasmuch as the component elements of this arrangement are in most significant respects identical with those of the first embodiment, they are designated by corresponding reference numerals, primed. It is not believed that further detailed description is required. In an arcuate installation of this sort, the conveyors will preferably be of a conventional link type, appropriately guided for orbital travel in both the horizontal and vertical senses. The conveyors 41' and the controls therefor are as described above and shown in Fig. 4. Should it be desired to install the equipment in a full 360°, circular outline, the conveyor 17' may be of a rigid horizontal traveling ring type.

The provisions for supplying erected cartons to operators at the candling booth 14' may comprise the elevated platform 12' serviced by the conveyor 25' from a carton set-up machine at a remote point. An operator at this platform distributes set-up cartons for subsequent distribution to the various gravity delivery chutes 27'.

I claim:

1. Egg room equipment comprising a conveyor, means defining a plurality of work stations arranged along one side thereof, a plurality of individual conveyors extending transversely across said conveyor into said stations, a platform disposed over said individual conveyors and in generally elevated relation to said work stations on the side of the first named conveyor opposite said stations, material handling means on said platform, and a plurality of delivery devices discharging downwardly from an elevation substantially above said platform and adjacent said material handling means to said stations to discharge in the latter adjacent said first named conveyor, said first named conveyor including vertically spaced reaches and said individual transverse conveyors being positioned between said reaches.

2. Egg room equipment comprising a continuous, endless driven conveyor, means defining a plurality of work stations arranged therealong, a plurality of individual conveyors extending transversely across said conveyor into said stations, a platform disposed over said individual conveyors and in generally elevated relation to said stations, means on said platform to handle packaging material, and means to deliver packaging material from points substantially above said platform and adjacent said material handling means to said stations, said individual conveyors including means automatically controlled by articles transported thereon to govern the operation thereof, said first named conveyor including vertically spaced reaches and said individual conveyors being positioned to extend transversely between said reaches.

3. Egg room equipment comprising a continuous, endless driven conveyor, means defining a plurality of work stations arranged therealong, a plurality of individual, intermittently driven conveyors extending transversely across said conveyor into said stations, a platform disposed over said individual conveyors and in generally elevated relation to said stations, a further conveyor on said platform disposed in substantial parallelism with said first named conveyor, and means to deliver packaging material from points substantially above said platform and adjacent said further conveyor to said stations, said individual conveyors including means automatically controlled by articles transported thereon to govern the intermittent drive thereof, said first named conveyor including vertically spaced reaches and said individual conveyors being positioned to extend transversely between said reaches.

4. Egg room equipment comprising a continuous, endless driven conveyor, means defining a plurality of work stations arranged along one side thereof, a plurality of individual driven conveyors extending transversely across said conveyor into said stations, a platform disposed over said individual conveyors and in generally elevated relation to said stations, a further conveyor on said platform on the same side of the work stations as said first conveyor, said further conveyor being in substantial parallelism with said first named conveyor, and means to deliver packaging material from points substantially above said platform and adjacent said further conveyor to said stations, said first named conveyor including vertically spaced reaches and said individual conveyors being positioned to extend transversely between said reaches.

5. Egg room equipment comprising an endless driven conveyor having vertically spaced horizontal reaches, means defining a plurality of work stations arranged along one side thereof, a plurality of individual intermittently driven conveyors extending transversely across said conveyor into said stations, a platform in elevated relation to said stations and paralleling the first named conveyor, a further endless driven conveyor disposed on said platform in substantial parallelism with said first named conveyor, and means to deliver packaging material from an elevation substantially above said platform and adjacent said further conveyor to said stations, said individual conveyors being positioned to extend transversely between said first named conveyor reaches and including means automatically controlled by articels conveyed thereby to govern the intermittent drive thereof.

6. Egg room equipment comprising an elongated conveyor, means defining a plurality of work stations arranged along one side thereof, a plurality of individual intermittently driven conveyors, one for each of said stations, extending transversely across said conveyor into said respective stations, a platform in elevated relation to said stations on the side of the first named conveyor opposite said stations, means on said platform for handling packaging material, and a plurality of gravity-type delivery devices, one for each of said stations, extending in downward inclination from an elevation substantially above said platform and adjacent said material handling means to said stations, said individual conveyors including means automatically controlled by articles conveyed thereby to govern the intermittent drive thereof, said first named conveyor including vertically spaced reaches and said individual conveyors being positioned to extend transversely between said reaches.

7. Egg room equipment comprising a conveyor, means defining a plurality of work stations arranged therealong, a plurality of conveyors acting transversely of said first named conveyor to supply said work stations, a platform over said transverse conveyors, material handling means on said platform, and delivery means discharging downwardly from an elevation substantially above said platform and adjacent said material handling means to said stations, said first named conveyor having vertically spaced reaches and said transversely acting conveyors being positioned to extend between said reaches.

8. Egg room equipment comprising a conveyor, means defining a plurality of work stations arranged therealong, a plurality of conveyors acting transversely of said first named conveyor to supply said work stations, a platform over said transverse conveyors and in elevated relation to said stations, material handling means on said platform, and delivery means discharging downwardly from an elevation substantially above said platform and adjacent said material handling means to said stations, said first named conveyor having vertically spaced reaches and said transversely acting conveyors being positioned to extend between said reaches.

JOHN W. COX.

REFERENCES CITED

The following references are of record in the file of this patent:

UNITED STATES PATENTS

| Number | Name | Date |
| --- | --- | --- |
| 1,270,501 | Dohm | June 25, 1918 |
| 1,474,651 | Taylor | Nov. 20, 1923 |
| 1,815,029 | Albertoli | July 21, 1931 |
| 2,293,498 | First et al. | Aug. 18, 1942 |
| 2,295,232 | Mitchell | Sept. 8, 1942 |
| 2,424,406 | Marshall et al. | July 22, 1947 |
| 2,440,840 | Blackwell | May 4, 1948 |
| 2,441,469 | Cameron | May 11, 1948 |